US012700646B2

(12) United States Patent
Jeong et al.

(10) Patent No.: US 12,700,646 B2
(45) Date of Patent: Aug. 4, 2026

(54) BATTERY MODULE INCLUDING MULTIPLE PARALLEL BATTERY CELLS

(71) Applicant: LG ENERGY SOLUTION, LTD., Seoul (KR)

(72) Inventors: Han-Yong Jeong, Daejeon (KR); Young-Su Son, Daejeon (KR); Kun-Joo Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 642 days.

(21) Appl. No.: 18/020,370

(22) PCT Filed: Sep. 29, 2021

(86) PCT No.: PCT/KR2021/013402
§ 371 (c)(1),
(2) Date: Feb. 8, 2023

(87) PCT Pub. No.: WO2022/145636
PCT Pub. Date: Jul. 7, 2022

(65) Prior Publication Data
US 2023/0299426 A1     Sep. 21, 2023

(30) Foreign Application Priority Data

Dec. 28, 2020     (KR) ........................ 10-2020-0185308

(51) Int. Cl.
*H01M 50/503*          (2021.01)
*H01M 10/653*          (2014.01)
(Continued)

(52) U.S. Cl.
CPC ....... *H01M 50/503* (2021.01); *H01M 10/653* (2015.04); *H01M 10/6554* (2015.04);
(Continued)

(58) Field of Classification Search
CPC .. H01M 50/503; H01M 50/507; H01M 50/51; H01M 50/512; H01M 50/509;
(Continued)

(56) References Cited

U.S. PATENT DOCUMENTS

2014/0255748 A1     9/2014   Jan et al.
2018/0366794 A1     12/2018  Kim et al.
(Continued)

FOREIGN PATENT DOCUMENTS

CN          205863251 U      1/2017
CN          206742309 U      12/2017
(Continued)

OTHER PUBLICATIONS (Translation of JP-2016516273) Atieva, "Battery Pack Bus Bar", Jun. 2, 2016.*
(Continued)

*Primary Examiner* — Raymond Alejandro
(74) *Attorney, Agent, or Firm* — Birch, Stewart, Kolasch & Birch, LLP

(57)          ABSTRACT

Disclosed is a battery module, which includes cylindrical battery cells erect such that top caps thereof face upward, and a bus bar unit connected to the cylindrical battery cells in series and in parallel. The cylindrical battery cells include a first bank cell group and a second bank cell group arranged in a first direction parallel to the first bank cell group. The bus bar unit includes a first terminal bus bar disposed on the first bank cell group and electrically connected to a positive electrode of each of the first cylindrical battery cells, a second terminal bus bar disposed on the second bank cell group and electrically connected to a negative electrode of each of the second cylindrical battery cells, and a fishbone bus bar electrically connected to a negative electrode of the
(Continued)

first cylindrical battery cells and a positive electrode of the second cylindrical battery cells.

16 Claims, 10 Drawing Sheets

(51) Int. Cl.
| | | |
|---|---|---|
| *H01M 10/6554* | (2014.01) | |
| *H01M 50/213* | (2021.01) | |
| *H01M 50/505* | (2021.01) | |
| *H01M 50/509* | (2021.01) | |

(52) U.S. Cl.
CPC ....... *H01M 50/213* (2021.01); *H01M 50/505* (2021.01); *H01M 50/509* (2021.01)

(58) Field of Classification Search
CPC ............. H01M 50/505; H01M 50/213; H01M 10/653; H01M 10/6554; H01M 10/655
See application file for complete search history.

(56) References Cited

U.S. PATENT DOCUMENTS

| | | |
|---|---|---|
| 2019/0348661 A1 | 11/2019 | Bae |
| 2020/0067060 A1 | 2/2020 | Collins et al. |
| 2020/0067155 A1 | 2/2020 | Hwang et al. |
| 2020/0194765 A1 | 6/2020 | Ryu |
| 2020/0227699 A1 | 7/2020 | Muratsu et al. |
| 2020/0395587 A1 | 12/2020 | Ryu et al. |

FOREIGN PATENT DOCUMENTS

| | | | | |
|---|---|---|---|---|
| CN | 208939063 U | 6/2019 | | |
| CN | 110854320 A | 2/2020 | | |
| CN | 210167430 U | 3/2020 | | |
| JP | 2006-244982 A | 9/2006 | | |
| JP | 2016516273 A | * 6/2016 | ............ | H01M 10/04 |
| JP | 2018-60595 A | 4/2018 | | |
| KR | 10-2017-0107800 A | 9/2017 | | |
| KR | 10-2018-0047383 A | 5/2018 | | |
| KR | 10-2018-0080541 A | 7/2018 | | |
| KR | 10-2019-0011096 A | 2/2019 | | |
| KR | 10-2019-0012059 A | 2/2019 | | |
| TW | M569089 U | 10/2018 | | |
| WO | WO 2011/092782 A1 | 8/2011 | | |
| WO | WO 2019/044724 A1 | 3/2019 | | |

OTHER PUBLICATIONS

International Search Report for PCT/KR2021/013402 (PCT/ISA/210) mailed on Jan. 24, 2022.
Extended European Search Report for European Application No. 21915434.1, dated Aug. 9, 2024.

\* cited by examiner

Related Art

BATTERY MODULE INCLUDING MULTIPLE PARALLEL BATTERY CELLS

TECHNICAL FIELD

The present application claims priority to Korean Patent Application No. 10-2020-0185308 filed on Dec. 28, 2020 in the Republic of Korea, the disclosures of which are incorporated herein by reference.

The present disclosure relates to a battery module, and more particularly, to a battery module having an efficient electric connection structure for multiple parallel battery cells.

BACKGROUND ART

A secondary battery refers to a battery that may be charged and discharged, unlike a primary battery that cannot be charged, and the secondary battery is being used as a power source for energy storage systems (ESS), electric vehicles (EVs), or hybrid electric vehicles (HEVs) as well as small high-tech electronic devices such as mobile phones, PDAs, and notebook computers.

At present, a single secondary battery (cell) cannot obtain sufficient output to drive an electric vehicle. In order to apply a secondary battery as an energy source for an electric vehicle, for example, a battery module in which a plurality of lithium ion battery cells are connected in series and/or in parallel should be configured, and generally a battery pack including a BMS (Battery Management System) for connecting the battery modules in series and functionally maintaining them, a cooling system, a BDU (Battery Disconnection Unit), and electrical wiring cables is configured.

Meanwhile, depending on the type of battery case, lithium ion battery cells may be classified into a can-type secondary battery in which an electrode assembly is embedded in a metal can and a pouch-type secondary battery in which an electrode assembly is embedded in a pouch of an aluminum laminate sheet. In addition, the can-type secondary battery may be further classified into a cylindrical battery and a rectangular battery according to the shape of the metal can. The exterior of the rectangular or cylindrical battery includes a case having an open end, namely a battery can, and a top cap hermetically coupled to the open end of the battery can.

When constituting a battery module using the cylindrical batteries, for example, as shown in FIG. 1, cylindrical batteries 1 of one bank (parallel bundle) are arranged side by side, and a bus bar 2 of a straight form is disposed between one bank and another adjacent bank. In addition, a top cap 1a (positive electrode) of each cylindrical battery 1 belonging to one bank is wire(W)-bonded to the bus bar 2, and a top end 1b (negative electrode) of a battery can of each cylindrical battery 1 belonging to another bank is connected to the bus bar 2 so that two banks are connected in series.

When the number of cylindrical batteries 1 belonging to one bank is small, the above connection method is possible. However, when the number of cylindrical batteries 1 belonging to one bank is very large, the length of one bank becomes too long, exceeding a predetermined dimension of the battery module, and thus it is difficult to arrange and electrically connect the cylindrical battery cells.

DISCLOSURE

Technical Problem

The present disclosure is designed to solve the problems of the related art, and therefore the present disclosure is directed to providing a battery module including multiple parallel battery cells in which, even if a large number of cylindrical battery cells are included in one bank, the cylindrical battery cells may be arranged within a predetermined dimension of the battery module and the banks may be connected in series.

The technical object to be solved by the present disclosure is not limited to the above, and other objects not mentioned herein will be clearly understood by those skilled in the art from the following disclosure.

Technical Solution

In one aspect of the present disclosure, there is provided a battery module including cylindrical battery cells including top caps and positioned such that the top caps face upward; and a bus bar unit connecting the cylindrical battery cells in series and in parallel, wherein the cylindrical battery cells include: a first bank cell group in which first cylindrical battery cells are arranged in two or more rows; and a second bank cell group in which second cylindrical battery cells are arranged in two or more rows in a first direction parallel to the first bank cell group, wherein the bus bar unit includes: a first terminal bus bar disposed on the first bank cell group and electrically connected to a positive electrode of each of the first cylindrical battery cells; a second terminal bus bar disposed on the second bank cell group and electrically connected to a negative electrode of each of the second cylindrical battery cells; and a fishbone bus bar disposed on the first bank cell group and the second bank cell group and electrically connected to a negative electrode of each of the first cylindrical battery cells and a positive electrode of each of the second cylindrical battery cells.

The fishbone bus bar may include a framework portion configured to extend in the first direction between the first bank cell group and the second bank cell group; a plurality of first branch portions spaced apart from each other by a first predetermined distance and configured to extend in a direction intersecting the first direction from the framework portion; and a plurality of second branch portions spaced apart from each other by a second predetermined distance and configured to extend in a direction opposite to the plurality of first branch portions from the framework portion.

The first terminal bus bar may include a plurality of third branch portions configured to extend alternately with the plurality of first branch portions between the rows of the first cylindrical battery cells, and the second terminal bus bar may include a plurality of fourth branch portions configured to extend alternately with the plurality of second branch portions between the rows of the second cylindrical battery cells.

The top cap of each of the first cylindrical battery cells may be wire-bonded to the plurality of third branch portions, a top end of a battery can of each of the first cylindrical battery cells may be wire-bonded to the plurality of first branch portions, the top cap of each of the second cylindrical battery cells may be wire-bonded to the plurality of second branch portions, and a top end of a battery can of each of the second cylindrical battery cells may be wire-bonded to the plurality of fourth branch portions.

The battery module may further comprise a cell case including a bottom frame having perforated holes perforated in an upper and lower direction so that bottom ends of the cylindrical battery cells are fitted therein; and a top frame coupled to an upper portion of the bottom frame and configured to cover the cylindrical battery cells.

The top frame may include an upper plate covering upper portions of the cylindrical battery cells, and the upper plate may include positive electrode connection holes formed below which the top cap of each of the cylindrical battery cells is located; and negative electrode connection holes formed below which a top edge of a battery can of each of the cylindrical battery cells is located.

The top frame may include bus bar mounting guides formed on a surface of the upper plate and protruding upwards, the bus bar mounting guides may be arranged in two or more rows in the first direction on the first cylindrical battery cells and the second cylindrical battery cells, and at least one of the bus bar mounting guides is provided in a same row as the positive electrode connection holes and at least another one of the bus bar mounting guides is provided in a same row as the negative electrode connection holes.

The bottom frame may include a first bushing hole formed through a corner region in an upper direction and a first bushing disposed in the first bushing hole, and the top frame may include a second bushing hole formed through a center region in a lower direction, and a second bushing interposed in the second bushing hole.

The battery module may further comprise a heat dissipation unit disposed below the bottom frame, and the heat dissipation unit may include a cooling plate made of a metal material and disposed below the bottom frame; an insulation sheet disposed on an upper surface of the cooling plate; a bonding sheet interposed between the insulation sheet and a lower surface of each of the cylindrical battery cells; and a thermally conductive material disposed on a lower surface of the cooling plate.

In another aspect of the present disclosure, there is also provided a battery module stack, which comprises two battery modules described above and a heatsink having a flow path in which a cooling water flows, wherein the two battery modules are arranged in layers to be vertically symmetric with the heatsink being interposed therebetween, and the heat dissipation unit of a first battery module among the two battery module contacts an upper surface of the heatsink and the heat dissipation unit of a second battery module among the two battery modules contacts a lower surface of the heatsink.

In still another aspect of the present disclosure, there is also provided a battery pack, comprising at least one battery module described above or at least one battery module stack described above.

Advantageous Effects

According to an embodiment of the present disclosure, it is possible to provide a battery module including multiple parallel cylindrical battery cells, in which a large number of cylindrical battery cells are arranged in two or more rows so that cylindrical battery cells belonging to one bank are efficiently arranged within an allowable dimension of the battery module, and banks are connected in series using a fishbone bus bar.

The effect of the present disclosure is not limited to the above, and other effects not mentioned herein will be clearly understood by those skilled in the art from this specification and the accompanying drawings.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

Figure 6:
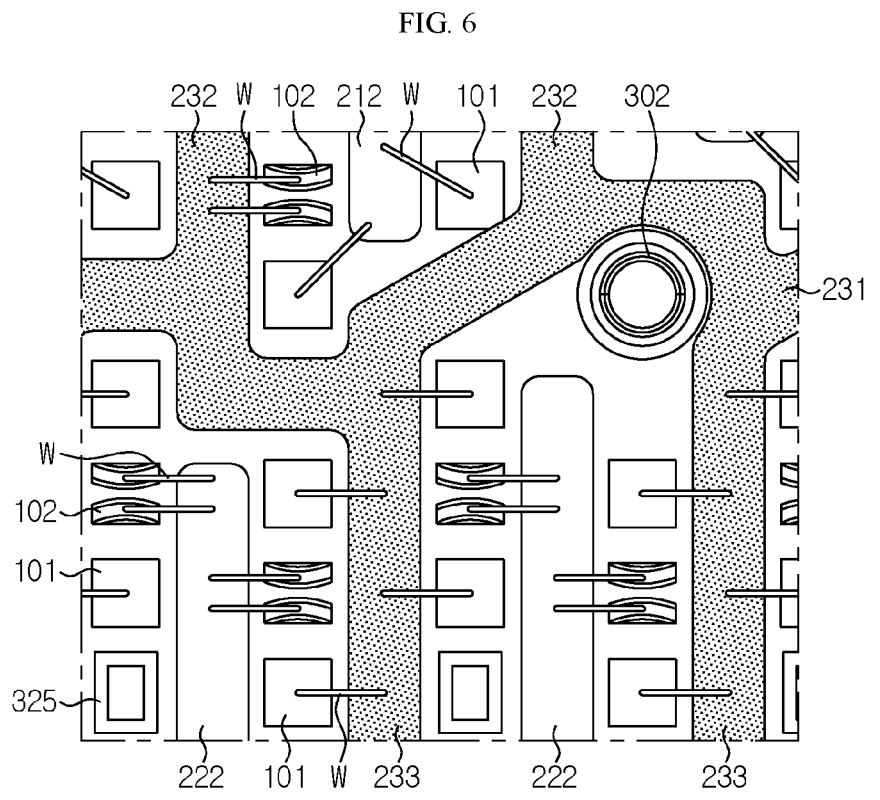

FIG. 6 is a partially enlarged view of FIG. 5.

FIG. 10 is a diagram showing a battery module stack according to an embodiment of the present disclosure.

BEST MODE

Figure 1:
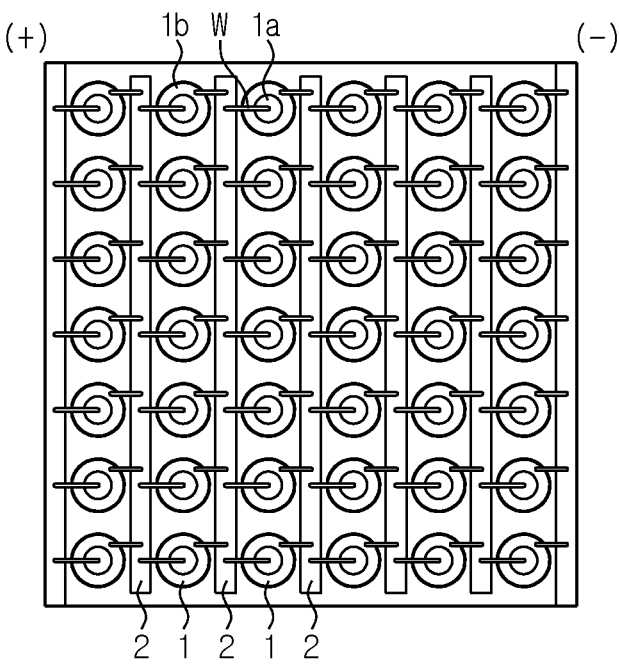
FIG. 1 is a diagram schematically showing an electric connection configuration of cylindrical battery cells of a conventional battery module.

Hereinafter, embodiments of the present disclosure will be described with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The description proposed herein is just an example for the purpose of illustrations only, not intended to limit the scope of the disclosure, so it should be understood that other equivalents and modifications could be made thereto without departing from the scope of the disclosure. In addition, since the embodiment of the present disclosure is provided to more fully explain the present disclosure to those skilled in the art, the shape and size of components in the drawings may be exaggerated, omitted or schematically illustrated for a clearer description. Accordingly, the size or proportion of each component does not fully reflect the actual size or proportion.

Figure 2:
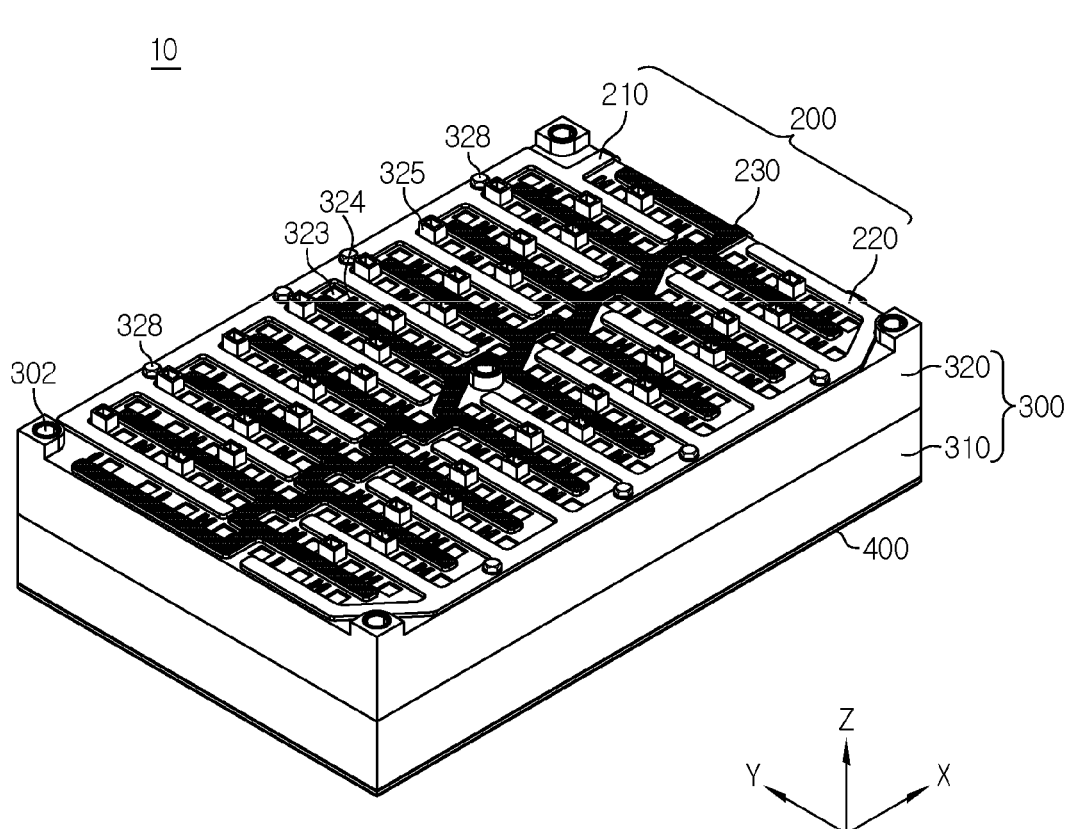
FIG. 2 is a schematic perspective view showing a battery module according to an embodiment of the present disclosure.
Figure 3:
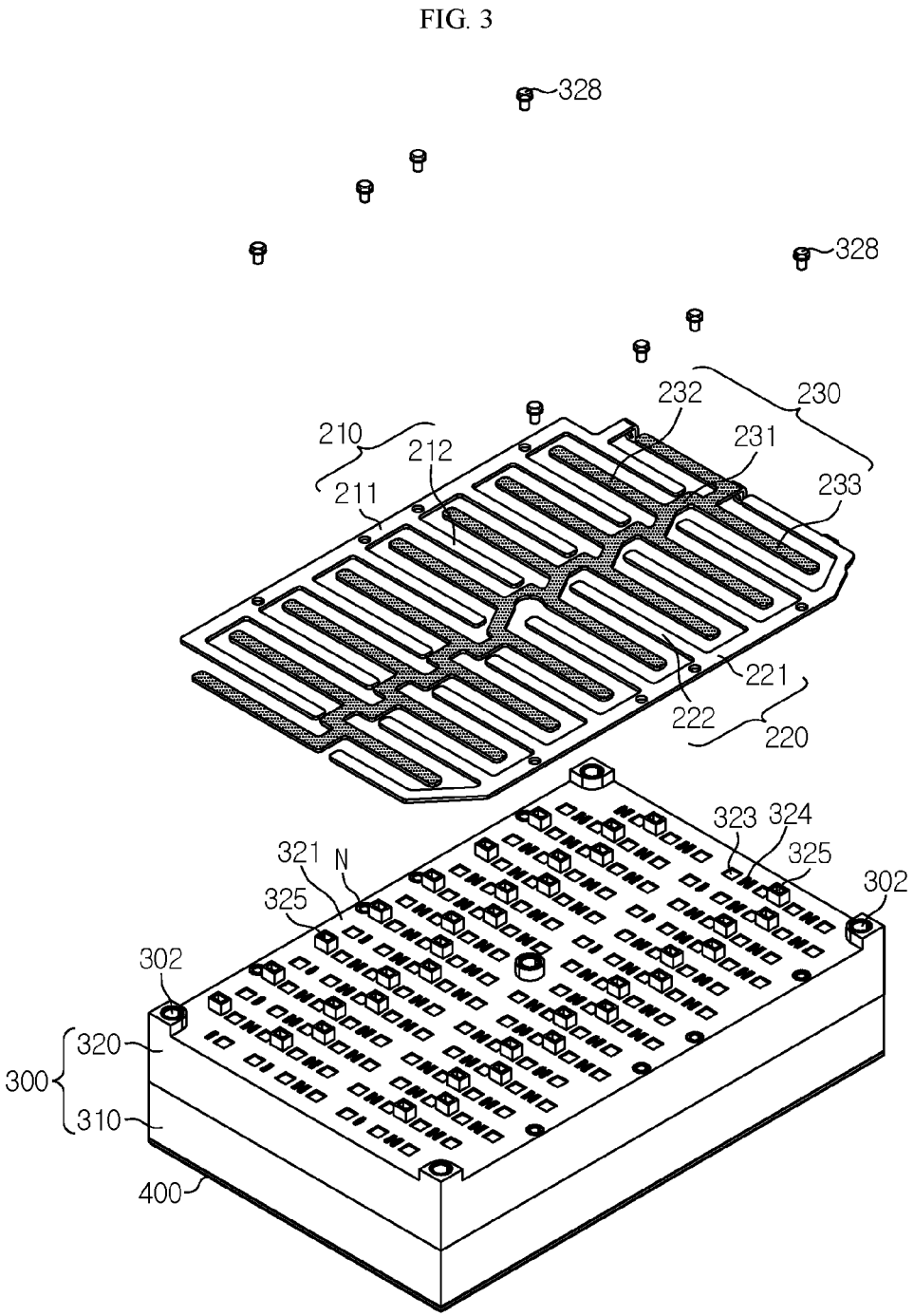
FIG. 3 is an exploded view showing that a bus bar unit is separated from the battery module of FIG. 2.
Figure 4:
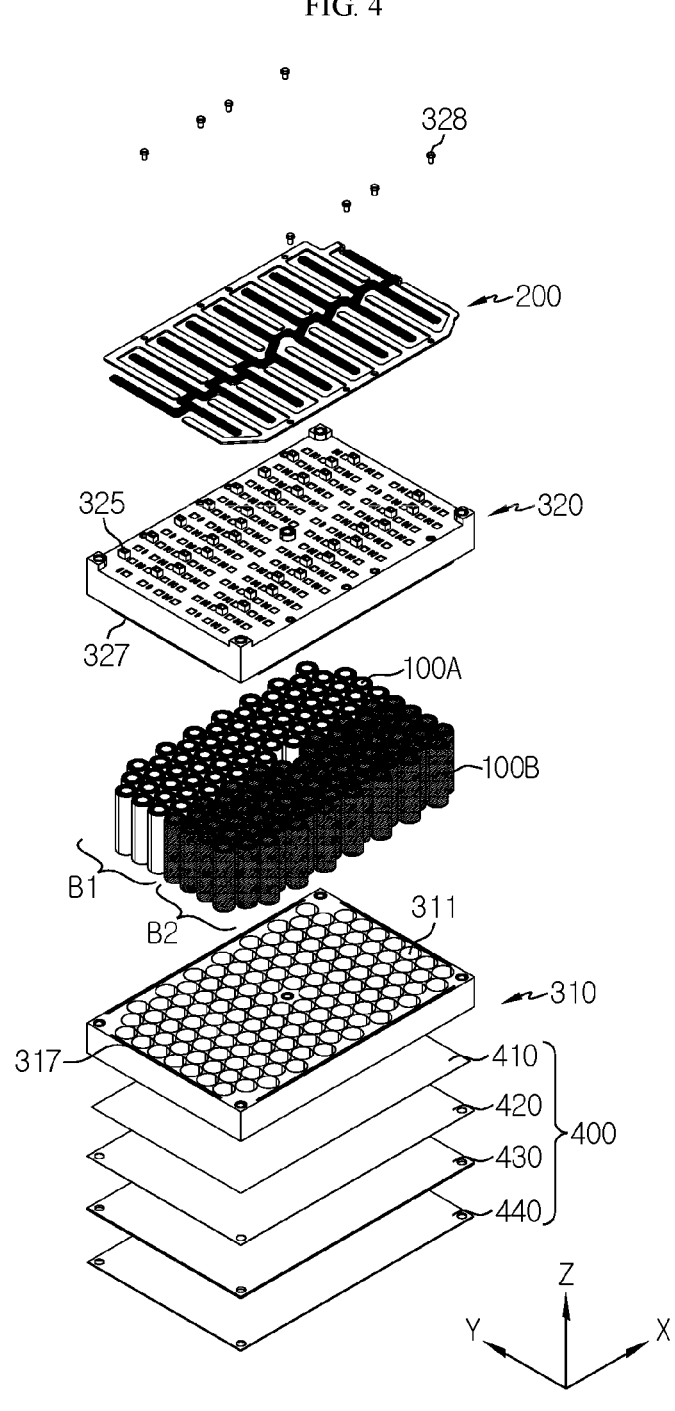
FIG. 4 is an exploded perspective view showing the battery module of FIG. 2.

FIG. 2 is a schematic perspective view showing a battery module according to an embodiment of the present disclosure, FIG. 3 is an exploded view showing that a bus bar unit is separated from the battery module of FIG. 2, and FIG. 4 is an exploded perspective view showing the battery module of FIG. 2.

Referring to these drawings, a battery module 10 according to an embodiment of the present disclosure includes can-type battery cells 100A, 100B, a bus bar unit 200, a cell case 300 and a heat dissipation unit 400.

The can-type battery cell may be a cylindrical battery cell 100A, 100B. The cylindrical battery cell 100A, 100B may be fabricated by putting an electrolyte and an electrode assembly in a cylindrical battery can 102, disposing a top cap 101 at a top open end of the battery can 102, and crimping the top open end of the battery can 102 for sealing.

The electrode assembly of the cylindrical battery cell 100A, 100B has a structure in which a positive electrode plate and a negative electrode plate are wound in a jelly-roll type with a separator being interposed therebetween. Also, a positive electrode tab is attached to the positive electrode plate, and the positive electrode tab is connected to the top cap 101. A negative electrode tab is attached to the negative electrode plate, and the negative electrode tab is connected to the bottom end of the battery can 102. Therefore, in the conventional cylindrical battery cell 100A, 100B, the top cap 101 may function as a positive electrode terminal and the battery can 102 may function as a negative electrode terminal.

Although this embodiment employs the cylindrical battery cell 100A, 100B as a can-type battery cell, it may be replaced with a rectangular battery cell having a rectangular parallelepiped shape. For reference, the rectangular battery cell may be configured such that the top cap 101 functions as a negative electrode terminal and the battery can 102 functions as a positive electrode terminal, as opposed to the cylindrical battery cell 100A, 100B.

The cylindrical battery cells 100A, 100B may be connected in series and/or in parallel according to the output and capacity required for the battery module 10. When expressing the electrical connection configuration of the battery module 10, the number of serially connected banks and the number of cylindrical battery cells 100A, 100B belonging to each bank are expressed as nS/mP (a natural number with n≥1, a natural number with m≥2). Here, the bank means an aggregate of cylindrical battery cells 100A, 100B connected in parallel to each other.

The battery module 10 according to this embodiment has two banks, and the number of cylindrical battery cells 100A, 100B included in each bank is about 60 to 70, and the cylindrical battery cells 100A, 100B belonging to one bank are relatively great compared to the number of banks serially connected.

As in FIG. 4, the cylindrical battery cells 100A, 100B are classified into a first bank cell group B1 and a second bank cell group B2. The first bank cell group B1 includes first cylindrical battery cells 100A arranged in two or more rows, and the second bank cell group B2 includes second cylindrical battery cells 100B arranged in two or more rows in a first direction (X-axis direction) parallel to the first bank cell group B1.

In the first bank cell group B1, the first cylindrical battery cells 100A may be arranged in 16 rows, and 3 to 5 first cylindrical battery cells 100A may be included in each row. For example, assuming that all of the first cylindrical battery cells 100A belonging to the first bank cell group B1 are arranged in one row, it may exceed the dimension required for the battery module 10. However, if the first cylindrical battery cells 100A are arranged as in this embodiment, the cylindrical battery cells 100A, 100B belonging to one bank may be disposed within a dimension range of the battery module 10.

The second bank cell group B2 may include second cylindrical battery cells 100B in 16 rows, and 3 to 5 second cylindrical battery cells 100B may be included in each row. The second cylindrical battery cells 100B may be arranged in the first direction (X-axis direction) in parallel to the first cylindrical battery cells 100A, and their rows may be arranged adjacent to each other.

The bus bar unit 200 is a component made of, for example, a metal such as copper to electrically connect the cylindrical battery cells 100A, 100B, and includes a first terminal bus bar 210, a second terminal bus bar 220, and a fishbone bus bar 230.

The first terminal bus bar 210 may be disposed on the first bank cell group B1 and may be electrically connected to a positive electrode of each of the first cylindrical battery cells 100A. The second terminal bus bar 220 may be disposed on the second bank cell group B2 and may be electrically connected to a negative electrode of each of the second cylindrical battery cells 100B. In addition, the fishbone bus bar 230 may be disposed on the first bank cell group B1 and the second bank cell group B2 and may be electrically connected to a negative electrode of each of the first cylindrical battery cells 100A and a positive electrode of each of the second cylindrical battery cells 100B. Here, the positive electrode of the first and second cylindrical battery cells 100A, 100B refers to the top cap 101, the negative electrode of the first and second cylindrical battery cells 100A, 100B refers to the top edge of the battery can 102, and a wire W is used as an electrical connection means.

Figure 5:
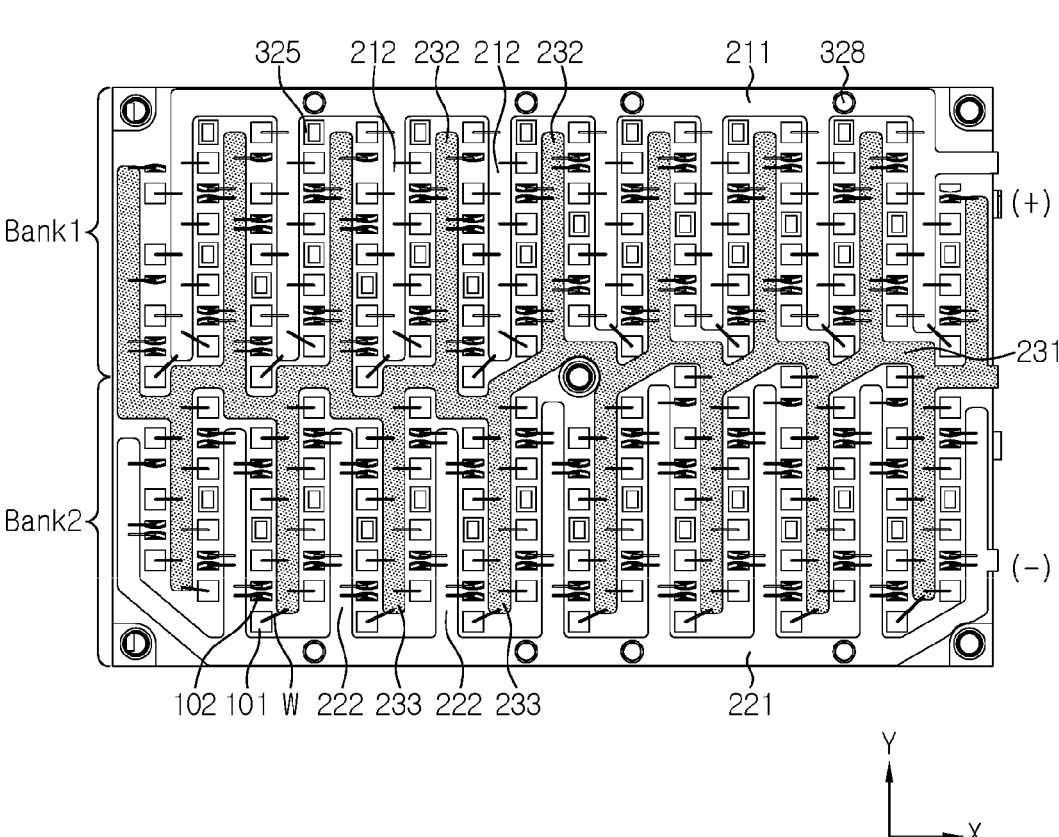
FIG. 5 is a diagram showing a wire-bonding state of the battery module according to an embodiment of the present disclosure.

Specifically, referring to FIGS. 4 to 5, the fishbone bus bar 230 will be described. The fishbone bus bar 230 includes a framework portion 231 extending in the first direction (X-axis direction) between the first bank cell group B1 and the second bank cell group B2, a plurality of first branch portions 232 spaced apart from each other by a predetermined distance and extending from the framework portion 231 in a direction (+Y-axis direction) intersecting the first direction, and a plurality of second branch portions 233 spaced apart from each other by a predetermined distance and extending from the framework portion 231 in a direction (−Y-axis direction) opposite to the plurality of first branch portions 232.

The first terminal bus bar 210 includes a first stem portion 211 extending in the first direction side by side at a location away from the framework portion 231, and a plurality of third branch portions 212 formed as one body with the first stem portion 211 and extending alternately (in −Y-axis direction) with the plurality of first branch portions 232 between the rows of the first cylindrical battery cells 100A.

In addition, the second terminal bus bar 220 includes a second stem portion 221 extending in the first direction side by side at a location away from the framework portion 231, and a plurality of fourth branch portions 222 formed as a body with the second stem portion 221 and extending alternately (in +Y-axis direction) with the plurality of second branch portions 233 between the rows of the second cylindrical battery cells 100B.

The top cap 101 of each first cylindrical battery cell 100A belonging to the first bank cell group B1 is wire(W)-bonded to the third branch portion 212 of the first terminal bus bar 210, and the tops of the battery cans 102 of the first cylindrical battery cells 100A are all connected in parallel by being wire(W)-bonded to the first branch portion 232 of the fishbone bus bar 230.

In addition, the top end of the battery can 102 of each of the second cylindrical battery cells 100B belonging to the second bank cell group B2 is wire(W)-bonded to the fourth branch portion 222 of the second terminal bus bar 220, and the top caps of the second cylindrical battery cells 100B 101 are all connected in parallel by being wire(W)-bonded to the second branch portion 233 of the fishbone bus bar 230.

At this time, the top ends of the battery cans 102 of all the first cylindrical battery cells 100A are connected to the plurality of first branch portions 232 of the fishbone bus bar 230, and since the top caps 101 of all second cylindrical battery cells 100B are connected to the plurality of second branch portions 233 of the fishbone bus bar 230, of course, the first bank cell group B1 and the second bank cell group B2 are connected in series.

According to the configuration, even if a large number of cylindrical battery cells 100A, 100B are included in one bank, the cylindrical battery cells 100A, 100B may be arranged in two or more rows within the dimension range required for the battery module 10, and the cylindrical battery cells 100A, 100B belonging to the same bank may be connected in parallel, and different banks may be connected in series.

Figure 7:
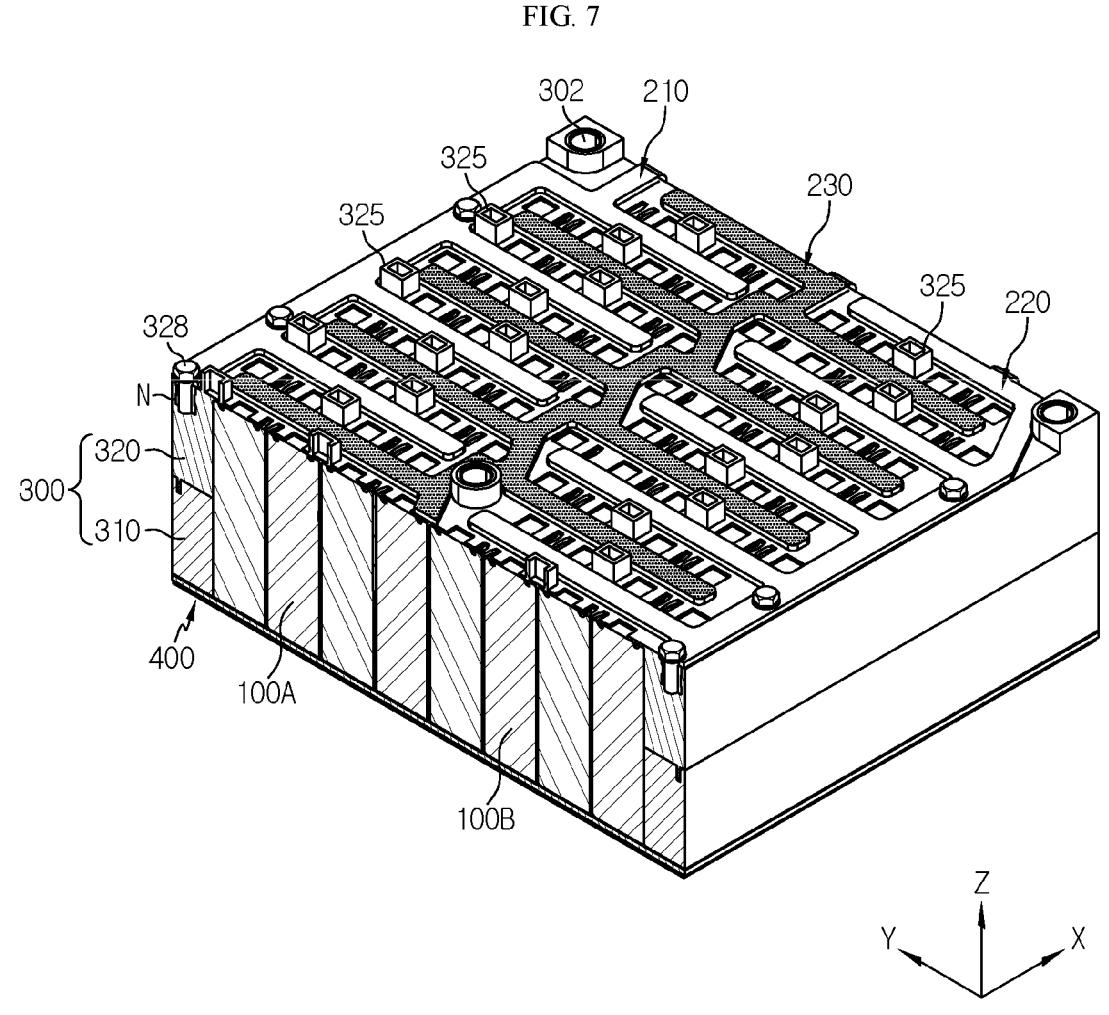
FIG. 7 is a sectional perspective view showing the battery module according to an embodiment of the present disclosure.
Figure 8:
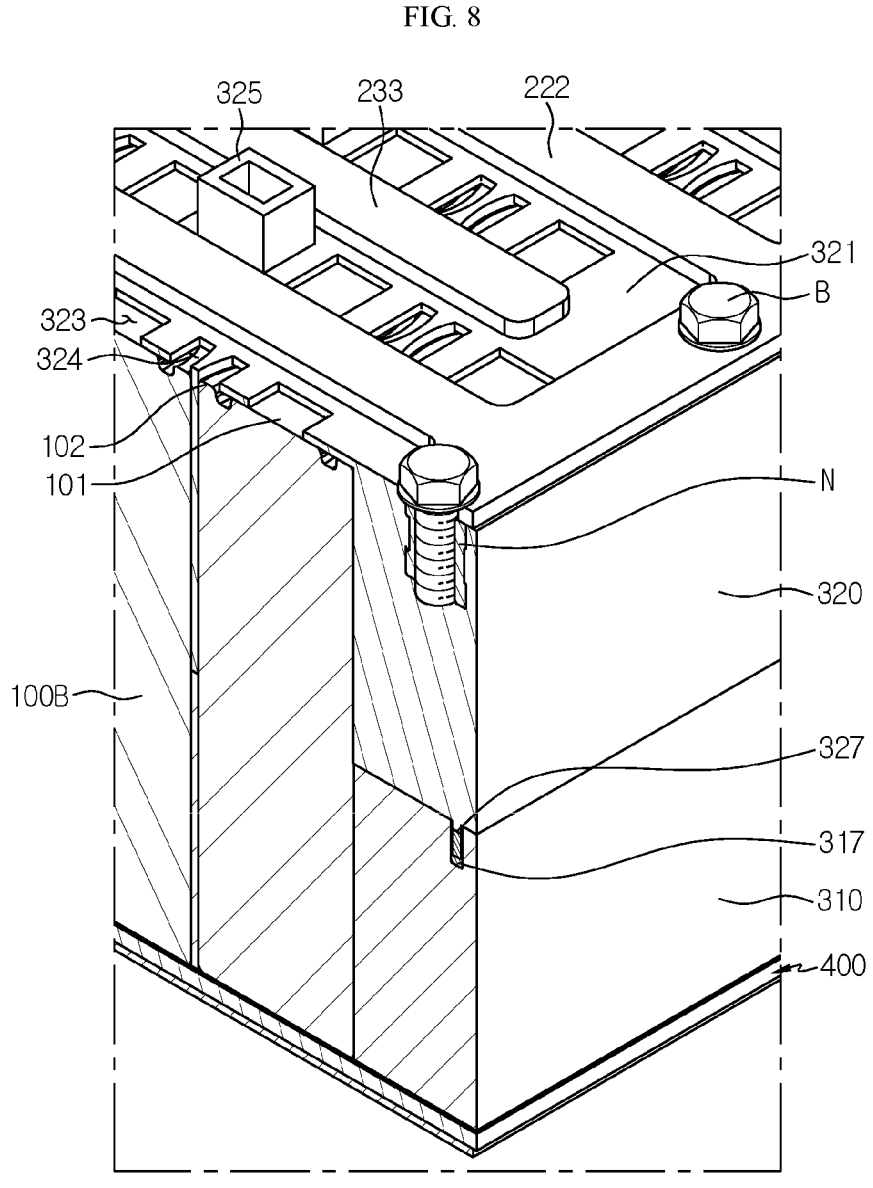
FIG. 8 is a partially enlarged view of FIG. 7.

Referring to FIGS. 7 and 8 along with FIGS. 3 to 4, the cell case 300 includes a bottom frame 310 and a top frame 320 as a configuration for holding the cylindrical battery cells 100A, 100B and protecting the cylindrical battery cells 100A, 100B from external impact or the like.

The bottom frame 310 may be provided in a substantially rectangular parallelopiped block shape having perforated holes 311 perforated in the upper and lower directions (±Z-axis direction). The lower surface of the bottom frame 310 may be covered by the heat dissipation unit 400, explained later. Lower ends of the cylindrical battery cells 100A, 100B may be inserted into the perforated holes 311 one by one so that the bottom surfaces thereof contact the heat dissipation unit 400. An uppermost layer of the heat dissipation unit 400 in contact with the bottom surfaces of the cylindrical battery cells 100A, 100B is made of a bonding sheet 410 or an adhesive.

The bottom surfaces of the cylindrical battery cells 100A, 100B inserted into the perforated holes 311 of the bottom frame 310 are adhered to the bonding sheet 410, and the lower ends thereof are interposed and fixed in the perforated holes 311. Therefore, if the bottom frame is used, the reliability of electrical connection may be increased by holding the cylindrical battery cells, and as explained later in detail, the bottom surfaces of the cylindrical battery cells may be easily cooled.

The top frame 320 may cover the cylindrical battery cells 100A, 100B and may be provided to be coupled to the upper portion of the bottom frame 310.

An insert pin 327 protruding downward may be provided at a bottom edge of the top frame 320, and an insert hole 317 into which the insert pin 327 may be inserted may be provided at a top edge of the bottom frame 310. In addition, the bottom frame 310 and the top frame 320 include bushing hole 302 respectively formed through a corner region and a center region thereof in the upper and lower direction, and a bushing interposed in the bushing hole 302. Although not shown in the drawing, the bottom frame 310 and the top frame 320 may be strongly fixedly coupled by inserting a long bolt (not shown) into the bushing.

The top frame 320 includes an upper plate 321 for covering the upper portions of the cylindrical battery cells 100A, 100B, and side plate portions for covering the side portions of the cylindrical battery cells 100A, 100B, and cell accommodating spaces formed to respectively surround the upper portions of the cylindrical battery cell 100A, 100B are formed at the inner side of the bottom frame 310. The cell accommodating spaces correspond to the perforated holes 311 of the bottom frame 310 in one-to-one relationship.

The bus bar unit 200 may be fixedly mounted to the upper surface of the upper plate 321. For example, the first stem portion 211 of the first terminal bus bar 210 may be fixed to one edge of the upper plate 321 by fastening a bolt 328, and the second stem portion 221 of the second terminal bus bar 220 may be fixed to the other edge of the upper plate 321 by fastening a bolt 328. The upper plate 321 may have an insert nut N at each place where the bolt 328 is fastened in order to prevent damage when the first terminal bus bar 210 and the second terminal bus bar 220 are fixed by fastening the bolt 328. The fishbone bus bar 230 may be fixed to the center of the upper plate 321 using an adhesive.

The upper plate 321 may include positive electrode connection holes 323 where the top cap 101 of each of the cylindrical battery cells 100A, 100B is located, and negative electrode connection holes 324 formed by perforating a region below which a top edge of the battery can 102 of each of the cylindrical battery cells 100A, 100B is located. The positive electrode connection holes 323 and the negative electrode connection holes 324 may communicate with the cell accommodating spaces. Through the positive electrode connection holes 323 and the negative electrode connection holes 324, the top cap 101 of each of the cylindrical battery cells 100A, 100B and the top end of the battery can 102 are exposed on the upper plate 321 and are wire(W)-bonded to the bus bar unit 200 as described above.

Each of the positive electrode connection holes 323 is in the form of a rectangular hole having a smaller size than the top cap 101 so that only the top cap 101 may be exposed on the upper plate, and each of the negative electrode connection holes 324 may be formed in the form of a hole reflecting the curvature of the top end of the battery can 102 so that only a partial line of the top edge of the battery can 102 may be exposed on the upper plate.

By forming the positive electrode connection holes 323 and the negative electrode connection holes 324 in this way, it is possible to clearly distinguish the positive electrode portion and the negative electrode portion of each cylindrical battery cell 100A, 100B and reduce the risk of unexpected short circuit during wire(W)-bonding.

The top frame 320 may further include bus bar mounting guides 325 formed to protrude upward from the surface of the upper plate 321.

The bus bar mounting guides 325 may be provided in a cube shape or a rectangular cylindrical shape, may be arranged in two or more rows in the first direction on the first cylindrical battery cells 100A and the second cylindrical battery cell 100B. At least one bus bar mounting guides 325 may be provided in the same row as the positive electrode connection holes 323 and the negative electrode connection holes 324.

The bus bar mounting guide 325 may serve as a reference for guiding the mounting positions of the first terminal bus bar 210, the second terminal bus bar 220 and the fishbone bus bar 230 when the bus bar unit 200 is mounted on the top plate. In addition, when external impact or vibration is applied, bus bar mounting guide 325 may allow the interval between the first terminal bus bar 210 and the fishbone bus bar 230 or between the second terminal bus bar 220 and the fishbone bus bar 230 not to be narrowed more than a certain interval, thereby preventing them from contacting each other.

The heat dissipation unit 400 may be disposed below the bottom frame 310 as a means for lowering the temperature by dissipating heat from the cylindrical battery cells 100A, 100B to the outside.

Figure 9:
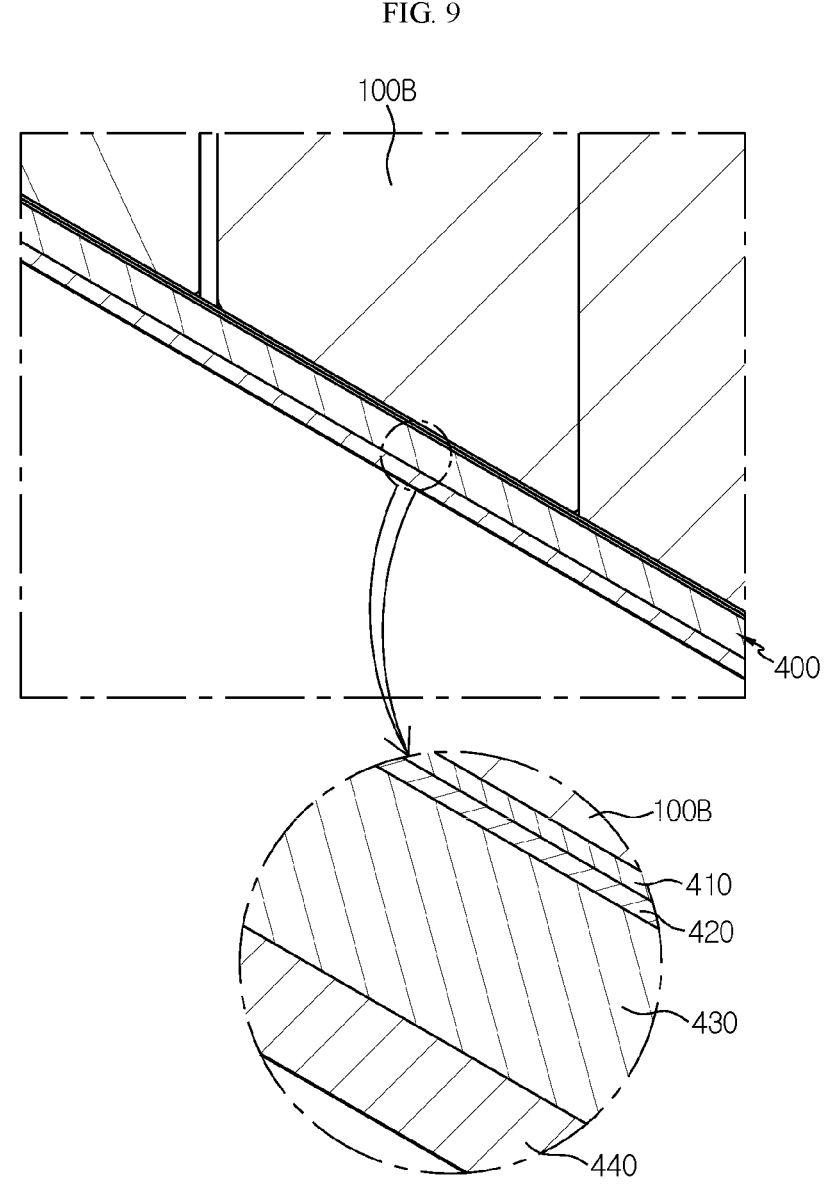
FIG. 9 is a partially enlarged view showing a heat dissipation unit of FIG. 8.

As shown in FIG. 9, the heat dissipation unit 400 may include a bonding sheet 410, an insulation sheet 420, a cooling plate 430, and a thermally conductive material 440.

The bonding sheet 410 preferably has adhesiveness and thermal conductivity. The bonding sheet 410 is interposed below the bottom frame 310 to contact the bottom surfaces of the battery cans 102 of all cylindrical battery cells 100A, 100B. The bonding sheet 410 may be replaced with a non-sheet type curable adhesive.

The insulation sheet 420 may be made of a silicon or graphite material having electrical insulation and heat dissipation properties. The insulation sheet 420 is applied to secure insulation and thermal conductivity between the cylindrical battery cells 100A, 100B and the cooling plate 430.

The cooling plate 430 is a plate-shaped body with mechanical rigidity and thermal conductivity, supports the cylindrical battery cells 100A, 100B at the lower part of the bottom frame 310, and plays a role of dissipating the heat generated by the cylindrical battery cells 100A, 100B to the outside. For example, the cooling plate 430 may be made of aluminum or an aluminum alloy.

The thermally conductive material 440 is interposed on the lower surface of the cooling plate 430. The thermally conductive material 440 plays a role of effectively conducting heat by filling a gap formed due to the difference in surface roughness when an object is in contact with another object, and promotes heat exchange between a heatsink 500, explained later, and the cooling plate 430. For example, thermal grease may be employed as the thermally conductive material 440.

Figure 10:
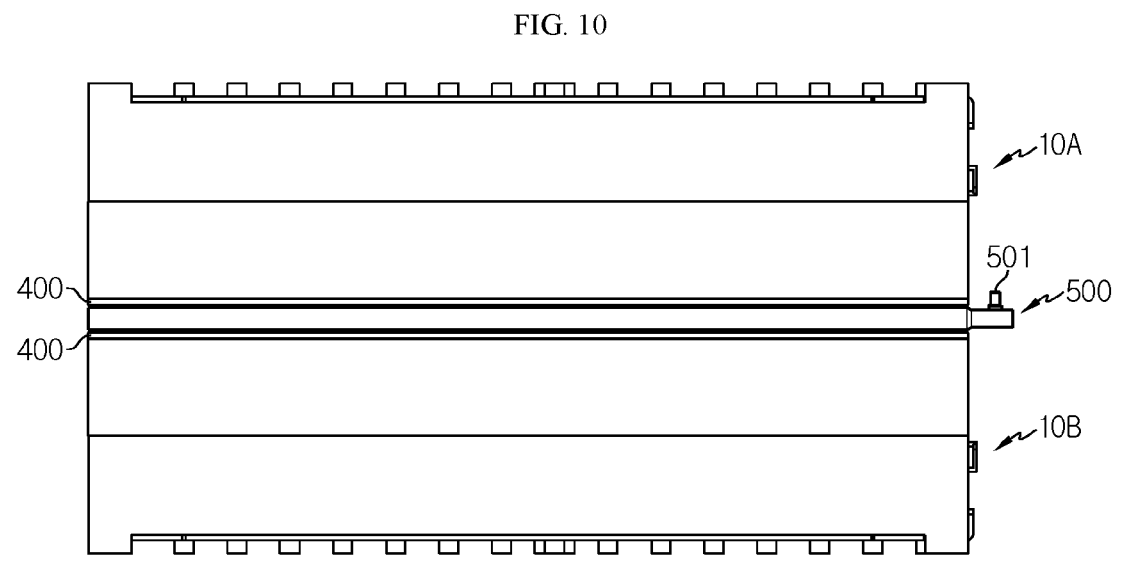

FIG. 10 is a diagram showing a battery module stack according to an embodiment of the present disclosure.

Next, with reference to FIG. 10, the battery module stack according to an embodiment of the present disclosure will be briefly described.

The battery module stack includes two battery modules 10A, 10B as described above and one heatsink 500. The heatsink 500 may be provided in a plate shape having a flow path through which a cooling water may flow, and a cooling water supply/discharge port 501 connected to the flow path.

As shown in the figure, the two battery modules 10A, 10B are arranged in layers to be vertically symmetric with the heatsink 500 being interposed therebetween, the heat dissipation unit 400 of the battery module 10A located at an upper side may be configured to contact the upper surface of the heatsink 500, and the heat dissipation unit 400 of the battery module 10B located at a lower side may be configured to contact the lower surface of the heatsink 500. Although not shown, plate-shaped brackets (not shown) may be mounted to both side surfaces of the two battery modules 10A, 10B and the heatsink 500, respectively, to integrally fix the two battery modules 10A, 10B and the heatsink 500.

Meanwhile, a battery pack according to the present disclosure may include at least one battery module 10 of the present disclosure. In addition to the battery module 10, the battery pack according to the present disclosure may further include a pack case for accommodating the battery module 10, and various devices for controlling charge and discharge of the battery module 10 such as a battery management system (BMS), a current sensor, a fuse or the like.

The battery module according to the present disclosure may be applied to a vehicle such as an electric vehicle or a hybrid electric vehicle, or an energy storage system (ESS).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these terms are merely for convenience in explanation and may vary based on a location of an observer or an object to be observed.

| Reference Signs | |
| --- | --- |
| 10: battery module | 100A, 100B: cylindrical battery cell |
| 101: top cap | 102: battery can |
| 200: bus bar unit | 210: first terminal bus bar |
| 211: first stem portion | 212: third branch portion |
| 220: second terminal bus bar | 221: second stem portion |
| 222: fourth branch portion | 230: fishbone bus bar |
| 231: framework portion | 232: first branch portion |
| 233: second branch portion | 300: cell case |
| 310: bottom frame | 311: perforated hole |
| 320: top frame | 321: upper plate |
| 323: positive electrode connection hole | 324: negative electrode connection hole |
| 325: bus bar mounting guide | 327: insert pin |
| 400: heat dissipation unit | 410: bonding sheet |
| 420: insulation sheet | 430: cooling plate |
| 440: thermally conductive material | 500: heatsink |

What is claimed is:

1. A battery module, comprising:

cylindrical battery cells including top caps and positioned such that the top caps face upward;

a bus bar unit connecting the cylindrical battery cells in series and in parallel, wherein the cylindrical battery cells include:

a first bank cell group in which first cylindrical battery cells are arranged in two or more rows; and a second bank cell group in which second cylindrical battery cells are arranged in two or more rows in a first direction parallel to the first bank cell group, wherein the bus bar unit includes:

a first terminal bus bar disposed on the first bank cell group and electrically connected to a positive electrode of each of the first cylindrical battery cells;

a second terminal bus bar disposed on the second bank cell group and electrically connected to a negative electrode of each of the second cylindrical battery cells; and a fishbone bus bar disposed on the first bank cell group and the second bank cell group and electrically connected to a negative electrode of each of the first cylindrical battery cells and a positive electrode of each of the second cylindrical battery cells; and a heat dissipation unit disposed below a bottom frame of a cell case, wherein the heat dissipation unit includes:

a cooling plate made of a metal material and disposed below the bottom frame; and an insulation sheet disposed on an upper surface of the cooling plate.

2. The battery module according to claim 1, wherein the fishbone bus bar includes:

a framework portion configured to extend in the first direction between the first bank cell group and the second bank cell group;

a plurality of first branch portions spaced apart from each other by a first predetermined distance and configured to extend in a direction intersecting the first direction from the framework portion; and a plurality of second branch portions spaced apart from each other by a second predetermined distance and configured to extend in a direction opposite to the plurality of first branch portions from the framework portion.

3. The battery module according to claim 2, wherein the first terminal bus bar includes a plurality of third branch portions configured to extend alternately with the plurality of first branch portions between the rows of the first cylindrical battery cells, and the second terminal bus bar includes a plurality of fourth branch portions configured to extend alternately with the plurality of second branch portions between the rows of the second cylindrical battery cells.

4. The battery module according to claim 3, wherein the top cap of each of the first cylindrical battery cells is wire-bonded to the plurality of third branch portions, and a top end of a battery can of each of the first cylindrical battery cells is wire-bonded to the plurality of first branch portions, and the top cap of each of the second cylindrical battery cells is wire-bonded to the plurality of second branch portions, and a top end of a battery can of each of the second cylindrical battery cells is wire-bonded to the plurality of fourth branch portions.

5. The battery module according to claim 1, further comprising:

a top frame coupled to an upper portion of the bottom frame and configured to cover the cylindrical battery cells, wherein the bottom frame of the cell case includes perforated holes perforated in an upper and lower direction such that bottom ends of the cylindrical battery cells are fitted therein.

6. The battery module according to claim 5, wherein the top frame includes an upper plate covering upper portions of the cylindrical battery cells, and wherein the upper plate includes:

positive electrode connection holes formed below which the top cap of each of the cylindrical battery cells is located; and negative electrode connection holes formed below which a top edge of a battery can of each of the cylindrical battery cells is located.

7. The battery module according to claim 6, wherein the top frame includes bus bar mounting guides formed on a surface of the upper plate and protruding upwards, the bus bar mounting guides are arranged in two or more rows in the first direction on the first cylindrical battery cells and the second cylindrical battery cells, and at least one of the bus bar mounting guides is provided in a same row as the positive electrode connection holes and at least another one of the bus bar mounting guides is provided in a same row as the negative electrode connection holes.

8. The battery module according to claim 6, wherein the bottom frame includes a first bushing hole formed through a corner region in an upper direction and a first bushing disposed in the first bushing hole, and the top frame includes a second bushing hole formed through a center region in a lower direction, and a second bushing interposed in the second bushing hole.

9. The battery module according to claim 5, further comprising:

a thermally conductive material disposed on a lower surface of the cooling plate, wherein the heat dissipation unit further includes:

a bonding sheet interposed between the insulation sheet and a lower surface of each of the cylindrical battery cells.

10. The battery module according to claim 1, wherein the cell case includes a plurality of holes located between the first terminal bus bar and the fishbone bus bar and the second terminal bus bar and the fishbone bus bar.

11. The battery module according to claim 1, wherein the fishbone bus bar is fixed to an upper plate of a top frame through an adhesive, and the first terminal bus bar and the second terminal bus bar are fixed to the upper plate of the top frame through a fastener.

12. The battery module according to claim 7, wherein the bus bar mounting guides are located between the first terminal bus bar and the fishbone bus bar and the second terminal bus bar and the fishbone bus bar.

13. The battery module according to claim 12, wherein the bus bar mounting guides are located above the bus bar unit.

14. The battery module according to claim 12, wherein the cell case includes a plurality of holes, and wherein the bus bar mounting guides overlap with the plurality of holes.

15. A battery module stack, which comprises two battery modules according to claim 9 and a heatsink having a flow path in which a cooling water flows, wherein the two battery modules are arranged in layers to be vertically symmetric with the heatsink being interposed therebetween, and the heat dissipation unit of a first battery module located at an upper side among the two battery modules contacts an upper surface of the heatsink and the heat dissipation unit of a second battery module located at a lower side among the two battery modules contacts a lower surface of the heatsink.

16. A battery pack, comprising at least one battery module according to claim 1.

* * * * *